(12) United States Patent  
Choi et al.

(10) Patent No.: US 9,639,704 B2  
(45) Date of Patent: May 2, 2017

(54) BIOGENETIC INFORMATION SECURITY

(71) Applicant: KT Corporation, Seongnam-si, Gyeonggi-do (KR)

(72) Inventors: Yoon-Sup Choi, Seoul (KR); Jun Hee Yoon, Seoul (KR)

(73) Assignee: KT Corporation, Gyeonggi-Do (KR)

( * ) Notice: Subject to any disclaimer, the term of this patent is extended or adjusted under 35 U.S.C. 154(b) by 302 days.

(21) Appl. No.: 14/582,442

(22) Filed: Dec. 24, 2014

(65) Prior Publication Data

US 2015/0178505 A1　Jun. 25, 2015

(30) Foreign Application Priority Data

Dec. 24, 2013　(KR) .......................... 10-2013-0162419

(51) Int. Cl.
　　G06F 12/14　　(2006.01)
　　G06F 21/60　　(2013.01)
　　G06K 9/00　　(2006.01)
　　G06F 21/62　　(2013.01)

(52) U.S. Cl.
　　CPC ........ G06F 21/602 (2013.01); G06F 21/6209 (2013.01); G06K 9/00147 (2013.01); G06K 9/00885 (2013.01); G06K 2009/00953 (2013.01)

(58) Field of Classification Search
　　CPC .............. G06F 21/602; G06F 21/6209; G06F 17/30345; G06K 2009/00953; G06K 9/00885; G06K 9/00147
　　See application file for complete search history.

(56) References Cited

U.S. PATENT DOCUMENTS

| | | | |
|---|---|---|---|
| 6,312,911 B1* | 11/2001 | Bancroft ................ | B82Y 10/00 435/6.11 |
| 2011/0280466 A1* | 11/2011 | Cho ........................ | G06F 19/22 382/133 |
| 2013/0266135 A1* | 10/2013 | Pratt ........................ | C12Q 1/68 380/28 |

FOREIGN PATENT DOCUMENTS

KR　　1020090068686　　6/2009
KR　　1020110033880　　4/2011

* cited by examiner

Primary Examiner — Shewaye Gelagay
Assistant Examiner — Khoi Le
(74) Attorney, Agent, or Firm — Brundidge & Stanger, P.C.

(57) ABSTRACT

In one embodiment, an encryption device may retrieve authentic genetic information from a genetic information database, generate false genetic information based on the authentic genetic information, encrypt the false genetic information to produce encrypted genetic information, assign identifiers to respective segments of the encrypted genetic information, transmit the encrypted genetic information to be genetically analyzed to a gene analyzer, receive, from the gene analyzer, an analysis of the encrypted genetic information, and decrypt the analysis of the encrypted genetic information to parse the analysis of the authentic genetic information.

17 Claims, 9 Drawing Sheets

AUTHENTIC BIOGENETIC INFORMATION

BIOGENETIC INFORMATION SECURITY

TECHNICAL FIELD

The embodiments described herein pertain generally to security for biogenetic information.

BACKGROUND

Due to the intensely private nature of a person's biogenetic information, the utmost measures of security must be used to maintain its privacy. That is, as biogenetic information not only reveals the most intimate details of a person's health or well-being, but it is increasingly being used for personal identification.

SUMMARY

In one example embodiment, a method performed under control of an encryption device may include: retrieving authentic genetic information from a genetic information database; generating false genetic information based on the authentic genetic information; encrypting the false genetic information to produce encrypted genetic information; assigning identifiers to respective segments of the encrypted genetic information; transmitting the encrypted genetic information to be genetically analyzed to a gene analyzer; receiving, from the gene analyzer, an analysis of the encrypted genetic information; and decrypting the analysis of the encrypted genetic information to parse the analysis of the authentic genetic information.

In another example embodiment, an encryption device may include: a retriever configured to retrieve authentic genetic information from a genetic information database; a generator configured to generate false genetic information based on the authentic genetic information; an encryptor component configured to encrypt the false genetic information to produce encrypted genetic information; an assignor component configured to assign identifiers to respective segments of the encrypted genetic information; a transmitter configured to transmit the encrypted genetic information to be genetically analyzed to a gene analyzer; a receiver configured to receive, from the gene analyzer, an analysis of the encrypted genetic information; and a decryptor component configured to decrypt the analysis of the encrypted genetic information to parse the analysis of the authentic genetic information.

In yet another example embodiment, a computer-readable storage medium having thereon computer-executable instructions that, in response to execution, cause a device to perform operations may include: retrieving authentic genetic information from a genetic information database; generating false genetic information based on the authentic genetic information; encrypting the false genetic information to produce encrypted genetic information; assigning identifiers to respective segments of the encrypted genetic information; transmitting the encrypted genetic information to be genetically analyzed to a gene analyzer; receiving, from the gene analyzer, an analysis of the encrypted genetic information; and decrypting the analysis of the encrypted genetic information to parse the analysis of the authentic genetic information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
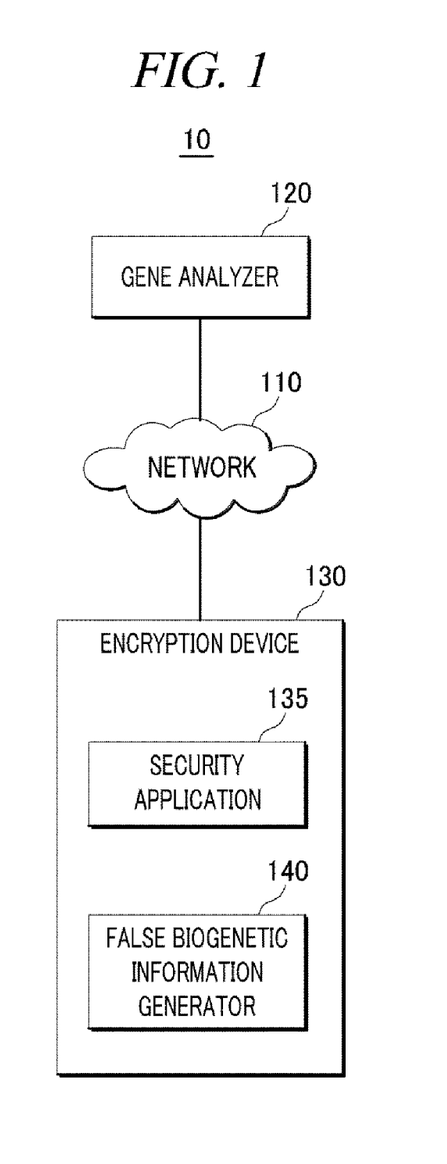
FIG. 1 shows an example system in which one or more embodiments of biogenetic information security may be implemented, in accordance with various embodiments described herein.

FIG. 1 shows an example system 10 in which one or more embodiments of biogenetic information security may be implemented, in accordance with various embodiments described herein. As depicted in FIG. 1, system 10 may include, at least, a gene analyzer 120 and an encryption device 130. Gene analyzer 120 and encryption device 130 may be communicatively connected to each other via a network 110.

Network 110 may be a wired or wireless information or telecommunications network. Non-limiting examples of network 110 may include a wired network such as a LAN (Local Area Network), a WAN (Wide Area Network), a VAN (Value Added Network), a telecommunications cabling system, a fiber-optics telecommunications system, or the like. Other non-limiting examples of network 110 may include wireless networks such as a mobile radio communication network, including at least one of a $3^{rd}$, $4^{th}$ or 5th generation mobile telecommunications network (3G), (4G), or (5G); various other mobile telecommunications networks; a satellite network; WiBro (Wireless Broadband Internet); Mobile WiMAX (Worldwide Interoperability for Microwave Access); HSDPA (High Speed Downlink Packet Access); or the like.

Gene analyzer 120 may be a processor-enabled computing device that is configured or operable to identify genetic/inherited disorders based on a person's biogenetic information and/or DNA sequencing. DNA sequencing may be used to determine the order of nucleotide bases that may be organic molecules that serve as the monomers, or subunits, of nucleic acids like DNA and RNA; and are composed of a nitrogenous base, a five-carbon sugar (ribose or deoxyribose), and at least one phosphate group. That is, each molecule of DNA may be made from adenine, guanine, cytosine and thymine, which determine what function respective genes perform. Gene analyzer 120 may be configured or operable to generate, e.g., information regarding genetic/inherited disorders and DNA sequencing as a result of the analysis of a person's biogenetic information.

Encryption device 130 may be a device configured to or operable to encrypt a person's biogenetic information, which may have been analyzed by gene analyzer 120. Non-limiting examples of encryption device 130 may include, but not be limited to, a notebook computer, a personal computer, a smart phone, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

Encryption device 130 may be configured or operable to retrieve a person's biogenetic information from a genetic information database in or otherwise associated with encryption device 130. As such biogenetic information is assumed to be untainted in any manner, it may be regarded as being authentic biogenetic information. The authentic biogenetic information may include a plurality of single nucleotide polymorphism (SNP) numbers and a plurality of genotypes corresponding to the respective SNP numbers, such as rsID1(SNP number)-Genotype1, and rsID2-Genotype2, etc.

The SNP numbers may be a useful tool for studying variations between whole genomes and determining disease susceptibility. The corresponding genotypes of a person may be the inherited map within his genetic code. Thus, based on the SNP numbers and the corresponding genotypes, information regarding a person's genetic/inherited disorders and DNA sequencing may be generated.

After retrieving the authentic biogenetic information, encryption device 130 may encrypt the authentic biogenetic information. Further, false biogenetic information generator 140 included in encryption device 130 may generate false biogenetic information that may include the same SNP numbers as authentic biogenetic information, but the false biogenetic information may include distinct genotypes corresponding to the respective SNP numbers from those of the authentic biogenetic information. For example, if the authentic biogenetic information includes Genotype 1 (as authentic) corresponding to a SNP number rsID1, encryption device 130 may generate false biogenetic information including false Genotype 1 corresponding to the SNP number rsID1. That is, encryption device 130 may generate false Genotype 1 that may include distinct information regarding the device user's genetic/inherited disorders and DNA sequencing.

After encryption device 130 generates the false biogenetic information, encryption device 130 may encrypt the false biogenetic information to produce encrypted biogenetic information. To produce the encrypted biogenetic information, encryption device 130 may or may not combine one or more portions of the false biogenetic information with at least one portion of the authentic biogenetic information.

As a non-limiting example, encryption device 130 may encrypt the authentic biogenetic information and/or the false biogenetic information into multiple, e.g., four, segments. That is, encryption device 130 may produce the first segment of the encrypted biogenetic information that includes a sequence of "false Genotype 1, false Genotype 2, Genotype 3, and Genotype 4," a second segment that includes a sequence of "Genotype 1, Genotype 2, false Genotype 3, and false Genotype 4," a third segment that includes a sequence of "false Genotype 1, false Genotype 2, false Genotype 3, and false Genotype 4," and a fourth segment that includes a random sequence of "Genotype 1, false Genotype 2, Genotype 3, and false Genotype 4." In the fourth segment, a combination and sequence of Genotypes and false Genotypes may be randomly determined by encryption device 130 to produce a dummy segment not to be used to retrieve the authentic biogenetic information.

Further to the example, encryption device 130 may encrypt respective segments of the biogenetic information that are respectively a hybrid of authentic biogenetic information and false biogenetic information, e.g., hybrid data, or is wholly comprised of false biogenetic information, e.g., artificial data. Still further to the example, the hybrid data may include at least one false Genotype and at least one Genotype, while the wholly artificial data may include only false Genotypes. Therefore, within the context of the present example, encryption device 130 may classify the first, second, and fourth segment of the encrypted biogenetic information as hybrid data, and classify the third segment thereof as wholly artificial data.

After encryption device 130 produces the segments of the encrypted biogenetic information, encryption device 130 may assign identifiers to the respective segments. The identifiers may be, as a non-limiting example, any permutation of alphanumeric characters and/or words. For example, encryption device 130 may assign "1" to the first segment, "2" to the second segment, "3" to the third segment, and "4" to the fourth segment. Because encryption device 130 may require segments corresponding to the identifiers 1 to 3, encryption device 130 may store identifiers 1 to 3 to be used to retrieve the first, second, and third segment from among four segments including the fourth segment corresponding to "identifier 4" whose genotypes are randomly arranged to deceive the feasible computer hackers.

Further to the example, encryption device 130 may store identifier "3" separately from "1" and "2" because encryption device 130 may compare the third segment that may be, e.g., wholly artificial data, to the first and the second segments, so as to retrieve the authentic biogenetic information.

As an example of how to retrieve the authentic biogenetic information, to retrieve "Genotype 3" and "Genotype 4" included in the authentic biogenetic information, encryption device 130 may compare the first segment including a sequence of "false Genotype 1, false Genotype 2, Genotype 3, and Genotype 4" with the third segment including a sequence of "false Genotype 1, false Genotype 2, false Genotype 3, and false Genotype 4".

That is, encryption device 130 may delete "false Genotype 1" and "false Genotype 2" in the first segment, because "false Genotype 1" and "false Genotype 2" are common Genotypes included in both the first and the third segments. Similarly, encryption device 130 may retrieve "Genotype 1" and "Genotype 2" by comparing the second segment with the third segment.

After encryption device 130 assigns identifiers to the respective segments of the encrypted biogenetic information, encryption device 130 may, to gene analyzer 120, the respective segments of the encrypted biogenetic information, which are to be genetically analyzed, and the assigned identifiers. When gene analyzer 120 receives the respective segments and the assigned identifiers, gene analyzer 120 may genetically analyze a plurality of authentic biogenetic information and false biogenetic information included the respective segments of the encrypted biogenetic information by conducting operations to determine the order of the nucleotide bases, adenine, guanine, cytosine, and thymine, in a DNA oligonucleotide.

As a result of genetic analysis, gene analyzer 120 may produce analysis of possible genetic/inherited disorders and/or DNA sequences corresponding to the plurality of authentic biogenetic information and false biogenetic information. Then, gene analyzer 120 may transmit, to encryption device 130, the analysis of the encrypted biogenetic information, the encrypted biogenetic information, and the assigned identifiers.

After encryption device 130 receives the encrypted biogenetic information, the analysis of the encrypted biogenetic information, and the assigned identifiers, encryption device 130 may retrieve the first, the second, the third segments and their respective analyses, by comparing the assigned identifiers to the respective segments with identifiers 1 to 3.

That is, if one of the assigned identifiers to the respective segments matches with one of the identifiers stored in encryption device 130, e.g., identifiers 1 to 3, encryption device 130 may restore the corresponding segments and their analysis, because encryption device 130 may require only segments corresponding to the identifiers 1 to 3 and the fourth segment and its analysis may be generated. Therefore, encryption device 130 may restore the first, the second, the third segments and their respective analyses based on the comparison of identifiers.

While or after encryption device 130 compares the first and the second segment to the third segment, encryption device 130 may decrypt the first, the second, and the third segments by deleting common false Genotypes and the analyses in the first segment and by further deleting common false Genotypes and the analyses in the second segment, because the third segment may include only false Genotypes.

As an example of retrieving the authentic biogenetic information and the analysis, to retrieve "Genotype 3," "Genotype 4," and the analyses, encryption device 130 may compare a sequence of "false Genotype 1, false Genotype 2, Genotype 3, and Genotype 4" in the first segment with a sequence of "false Genotype 1, false Genotype 2, false Genotype 3, and false Genotype 4" in the third segment. Because "false Genotype 1, false Genotype 2" in the first segment matches "false Genotype 1, false Genotype 2" in the third segment, encryption device 130 may delete "false Genotype 1," "false Genotype 2" and the analyses in the first segment. Therefore, encryption device 130 may retrieve "Genotype 3," "Genotype 4," and the analyses in the first segment.

Similarly, to retrieve "Genotype 1," "Genotype 2," and the analyses, encryption device 130 may compare a sequence of "Genotype 1, Genotype 2, false Genotype 3, and false Genotype 4" in the second segment with a sequence of "false Genotype 1, false Genotype 2, false Genotype 3, and false Genotype 4" in the third segment. Because "false Genotype 3, false Genotype 4" in the second segment matches "false Genotype 3, false Genotype 4" in the third segment, encryption device 130 may delete "false Genotype 3," "false Genotype 4" and the analyses in the second segment. As a result, encryption device 130 may retrieve "Genotype 3," "Genotype 4," and the analyses in the second segment.

In addition, encryption device 130 may add the retrieved "Genotype 1", "Genotype 2," and the analyses in the first segment and the retrieved "Genotype 3," "Genotype 4," and the analyses in the second segment into the authentic biogenetic information and the analysis. Therefore, encryption device 130 may parse the analysis of the authentic biogenetic information by retrieving the analysis of the encrypted biogenetic information from the authentic biogenetic information and the analysis.

Thus, FIG. 1 shows an example system 10 in which one or more embodiments of a genetic information protection may be implemented, in accordance with various embodiments described herein.

Figure 2:
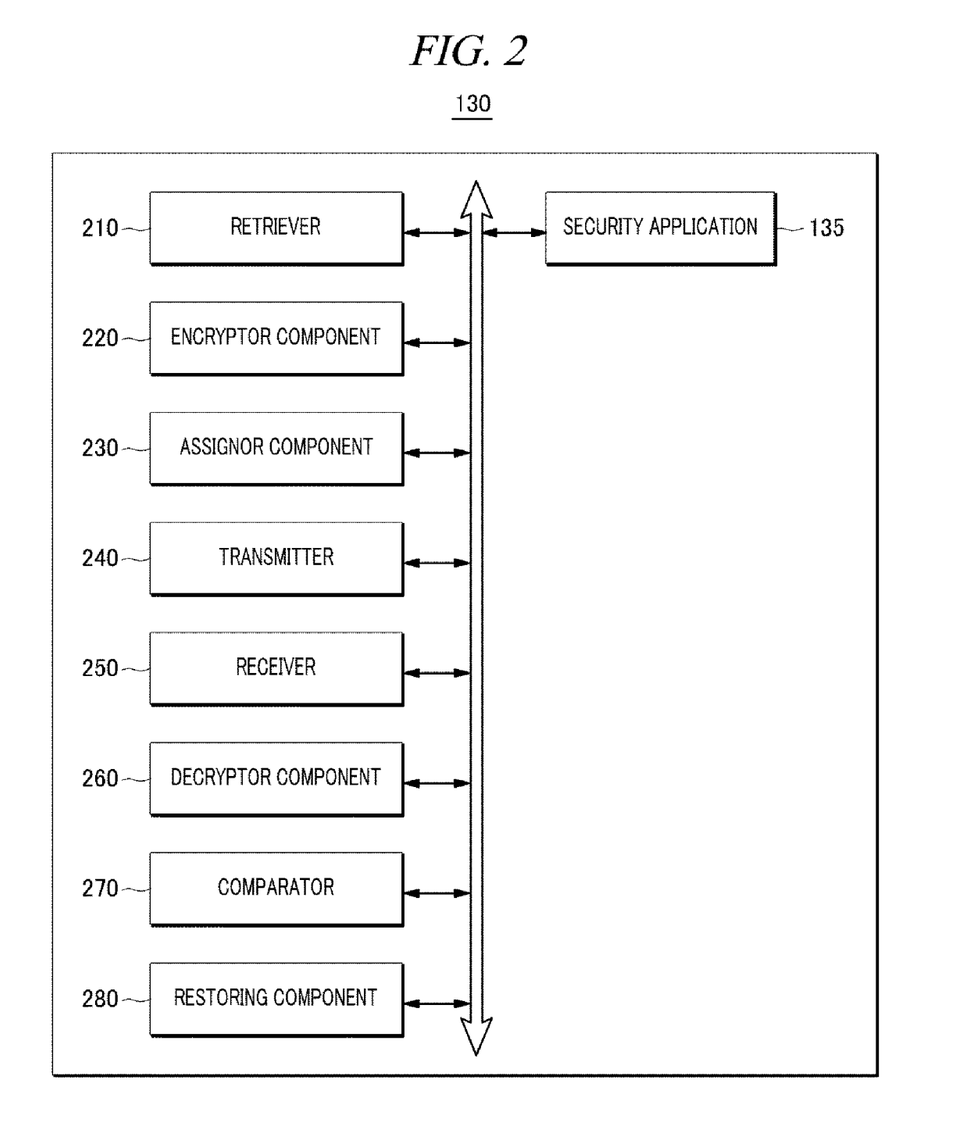
FIG. 2 shows an example application by which at least portions of biogenetic information security may be implemented, in accordance with various embodiments described herein.

FIG. 2 shows an example application by which at least portions of biogenetic information security may be implemented, in accordance with various embodiments described herein. Security application 135 that is hosted on and executable/operable on encryption device 130 may include a retriever 210 configured to retrieve authentic genetic information from a genetic information database; an encrypting component 220 configured to encrypt the false genetic information to produce encrypted genetic information; an assigning component 230 configured to assign identifiers to respective segments of the encrypted genetic information; a transmitter 240 configured to transmit the encrypted genetic information to be genetically analyzed to a gene analyzer; a receiver 250 configured to receive, from the gene analyzer, an analysis of the encrypted genetic information; and a decrypting component 260 configured to decrypt the analysis of the encrypted genetic information to parse the analysis of the authentic genetic information.

In some embodiments, retriever 210 may be configured to retrieve a person's biogenetic information from a genetic information database stored in encryption device 130 by searching the genetic information database to identify the person's biogenetic information based on metadata or on full-text (or other content-based) indexing. As such biogenetic information is assumed to be untainted in any manner, it may be regarded as being authentic biogenetic information. The authentic biogenetic information may include a plurality of single nucleotide polymorphism (SNP) numbers and a plurality of genotypes corresponding to the respective SNP numbers, such as rsID1(SNP number)-Genotype1, and rsID2-Genotype2, etc.

Encryption component 220 may be configured to encrypt the false genetic information generated by false biogenetic information generator 140 to produce encrypted genetic information. To produce the encrypted biogenetic information, encrypting component 230 may or may not combine one or more portions of the false biogenetic information with at least one portion of the authentic biogenetic information.

Assigning component 230 may be configured to assign identifiers to the respective segments. The identifiers may be, as a non-limiting example, any permutation of alphanumeric characters and/or words.

Transmitter 240 may be configured to transmit, to gene analyzer 120, the respective segments of the encrypted biogenetic information, which are to be genetically analyzed, and the assigned identifiers.

Receiver 250 may be configured to receive, from the gene analyzer 120, an analysis of the encrypted genetic information, the encrypted biogenetic information, and the assigned identifiers.

Decrypting component 260 may be configured to decrypt the analysis of the encrypted genetic information to parse the analysis of the authentic genetic information. That is, decrypting component 260 may decrypt the first, the second, and the third segments by deleting common false Genotypes and the analyses in the first segment, and by further deleting common false Genotypes and the analyses in the second segment, because the third segment may include only false Genotypes. The third segment may not be required to parse the analysis of the authentic biogenetic information.

Thus, FIG. 2 shows an example application by which at least portions of biogenetic information security may be implemented, in accordance with various embodiments described herein.

Figure 3:
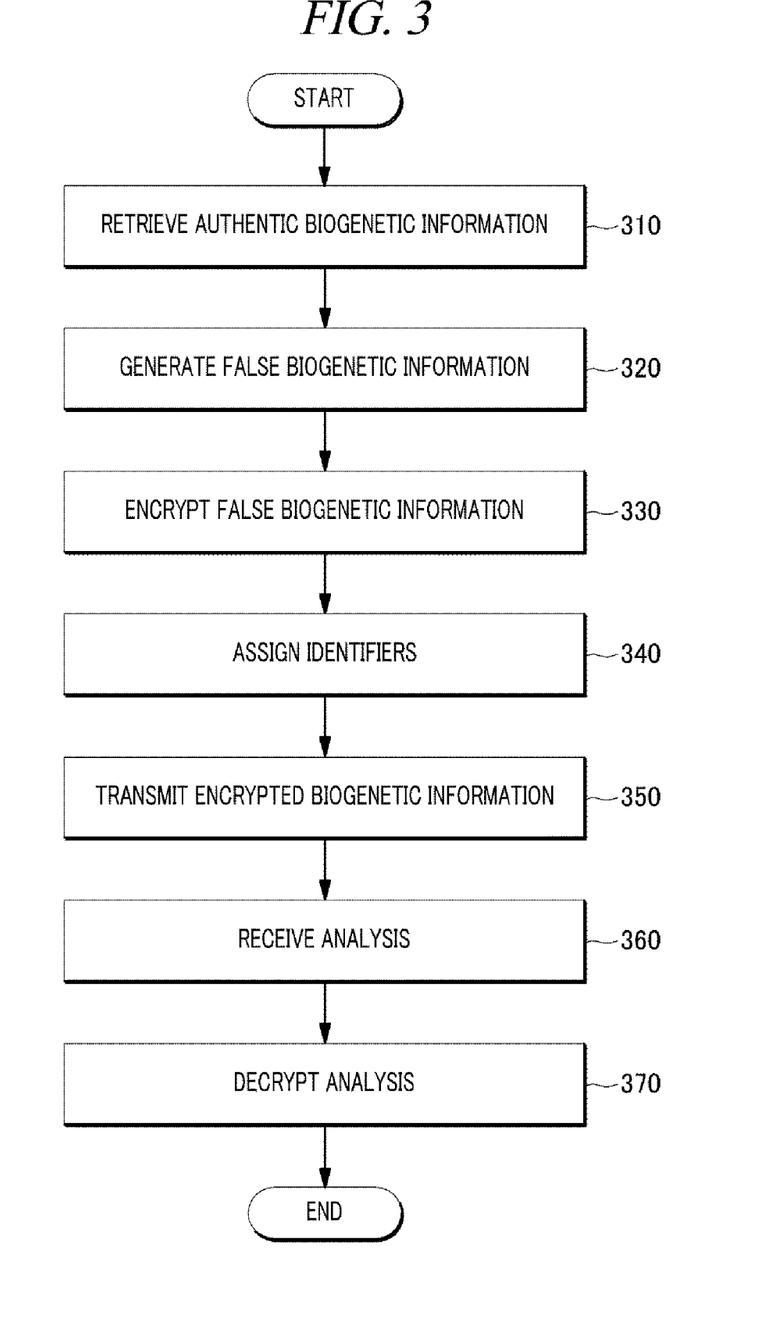
FIG. 3 shows an example processing flow of operations by which at least portions of biogenetic information security may be implemented, in accordance with various embodiments described herein.

FIG. 3 shows an example processing flow of operations, by which at least portions of biogenetic information security may be implemented, in accordance with various embodiments described herein. The operations of processing flow 300 may be implemented in system configuration 10 including network 110, gene analyzer 120, and encryption device 130, as illustrated in FIG. 1. Processing flow 300 may include one or more operations, actions, or functions as illustrated by one or more blocks 310, 320, 330, 340, 350, 360 and/or 370. Although illustrated as discrete blocks, various blocks may be divided into additional blocks, combined into fewer blocks, or eliminated, depending on the desired implementation. Processing may begin at block 310.

Block 310 (Retrieve Authentic Biogenetic Information) may refer to an encryption device 130 retrieving a person's biogenetic information from a biogenetic information database. The authentic biogenetic information may include a plurality of single nucleotide polymorphism (SNP) numbers and a plurality of genotypes corresponding to the respective SNP numbers, such as rsID1(SNP number)-Genotype1, and rsID2-Genotype2, etc. Processing may proceed from block 310 to block 320.

Block 320 (Generate False Biogenetic Information) may refer to false biogenetic information generator 140 generating false biogenetic information that may include the same SNP numbers as authentic biogenetic information, while the false biogenetic information may include distinct genotypes corresponding to the respective SNP numbers from those of the authentic biogenetic information. Encryption device 130 may include false biogenetic information generator 140. Processing may proceed from block 320 to block 330.

Block 330 (Encrypt False Biogenetic Information) may refer to encryption device 130 encrypting the false biogenetic information to produce encrypted biogenetic information. To produce the encrypted biogenetic information, encryption device 130 may or may not combine one or more portions of the false biogenetic information with at least one portion of the authentic biogenetic information. Then, encryption device 130 may encrypt the authentic biogenetic information and/or the false biogenetic information into multiple, e.g., four, segments. Processing may proceed from block 330 to block 340.

Block 340 (Assign Identifiers) may refer to encryption device 130 assigning identifiers to the respective segments, e.g., four segments. For example, encryption device 130 may assign "1" to the first segment, "2" to the second segment, "3" to the third segment, and "4" to the fourth segment. Processing may proceed from block 340 to block 350.

Block 350 (Transmit Encrypted Biogenetic Information) may refer to encryption device 130 transmitting, to gene analyzer 120, the respective segments of the encrypted biogenetic information, which are to be genetically analyzed, and the assigned identifiers. When gene analyzer 120 receives the respective segments and the assigned identifiers, gene analyzer 120 may genetically analyze a plurality of authentic biogenetic information and false biogenetic information included the respective segments of the encrypted biogenetic information by conducting operations to determine the order of the nucleotide bases, adenine, guanine, cytosine, and thymine, in a DNA oligonucleotide.

As a result of genetic analysis, gene analyzer 120 may produce analysis such as genetic/inherited disorders and/or DNA sequences corresponding to the plurality of authentic biogenetic information and false biogenetic information. Then, gene analyzer 120 may transmit, to encryption device 130, the analysis of the encrypted biogenetic information, the encrypted biogenetic information, and the assigned identifiers. Processing may proceed from block 350 to block 360.

Block 360 (receive analysis) may refer to encryption device 130 receiving the encrypted biogenetic information, the analysis of the encrypted biogenetic information, and the assigned identifiers. Processing may proceed from block 360 to block 370.

Block 370 (decrypt analysis) may refer to encryption device 130 decrypting the analysis of the encrypted biogenetic information. Encryption device 130 may retrieve the first, the second, the third segments and their respective analyses, by comparing the assigned identifiers to the respective segments with the identifiers stored in encryption device 130, i.e., identifiers 1 to 3.

While or after encryption device 130 compares the first and the second segment to the third segment, encryption device 130 may decrypt the first, the second, and the third segments by deleting common false Genotypes and the analyses in the first segment and by deleting common false Genotypes and the analyses in the second segment. Then, encryption device 130 may add the retrieved "Genotype 1", "Genotype 2", and the analyses in the first segment and the retrieved "Genotype 3", "Genotype 4", and the analyses in the second segment into the authentic biogenetic information and the analysis.

Thus, FIG. 3 shows an example processing flow of operations, by which at least portions of biogenetic information security may be implemented, in accordance with various embodiments described herein.

Figure 4A:
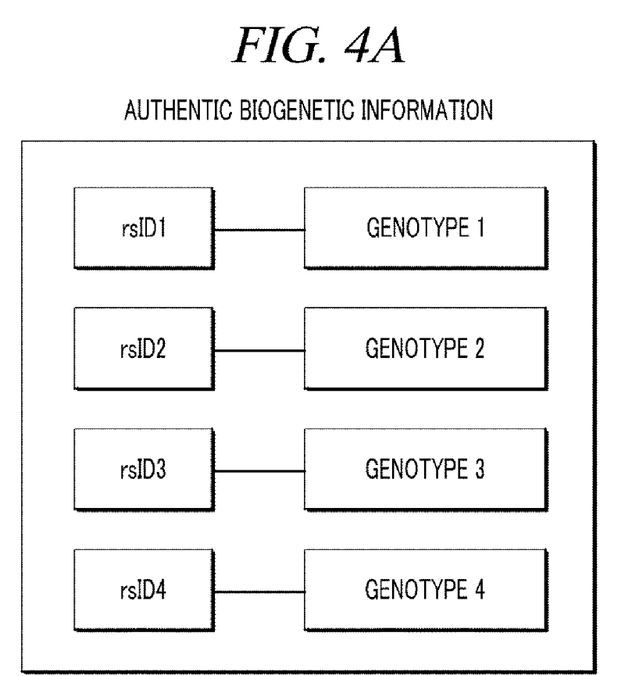
FIG. 4A shows a depiction of at least portions of biogenetic information, in accordance with at least portions of biogenetic information security, as described herein.

FIG. 4A shows a depiction of at least portions of biogenetic information, in accordance with at least portions of biogenetic information security, as described herein. FIG. 4A depicts the authentic biogenetic information and its components such as SNP numbers and Genotypes. Encryption device 130 may retrieve a person's biogenetic information from a genetic information database in encryption device 130, based on a predefined table recording multiple combinations of SNP numbers and Genotypes.

The retrieved biogenetic information may include a plurality of single nucleotide polymorphism (SNP) numbers and a plurality of genotypes corresponding to the respective SNP numbers, such as rsID1(SNP number)-Genotype1, and rsID2-Genotype2, etc.

The SNP numbers may be a useful tool for studying variations between whole genomes and determining disease susceptibility. The corresponding genotypes of a person may be the inherited map within his genetic code. Thus, based on the SNP numbers and the corresponding genotypes, information regarding a person's genetic/inherited disorders and DNA sequencing may be generated. Non limiting example of the person's biogenetic information may include rsID1-Genotype 1, rsID2-Genotype 2, rsID3-Genotype 3, and rsID4-Genotype 4.

Thus, FIG. 4A shows a depiction of at least portions of biogenetic information, in accordance with at least portions of biogenetic information security, as described herein.

Figure 4B:
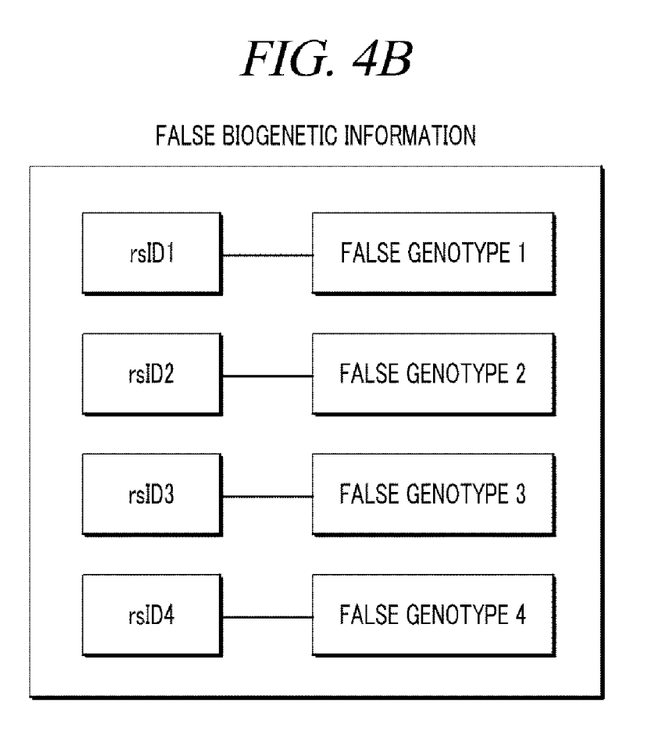
FIG. 4B shows a depiction of at least portions of biogenetic information, in accordance with at least portions of a biogenetic information protection, as described herein.

FIG. 4B shows a depiction of at least portions of biogenetic information, in accordance with at least portions of biogenetic information security, as described herein. FIG. 4B depicts the false biogenetic information and its components such as SNP numbers and false Genotypes. False biogenetic information generator 140 included in encryption device 130 may generate false biogenetic information that may include the same SNP numbers as authentic biogenetic information, but the false biogenetic information may include distinct genotypes corresponding to the respective SNP numbers from those of the authentic biogenetic information.

For example, if the authentic biogenetic information includes Genotype 1 (as authentic) corresponding to a SNP number rsID1, false biogenetic information generator 140 may generate false biogenetic information including false Genotype 1 corresponding to the SNP number rsID1. That is, false biogenetic information generator 140 may generate false Genotype 1 that may include distinct information regarding the device user's genetic/inherited disorders and DNA sequencing.

Thus, FIG. 4B shows a depiction of at least portions of biogenetic information, in accordance with at least portions of biogenetic information security, as described herein.

Figure 5:
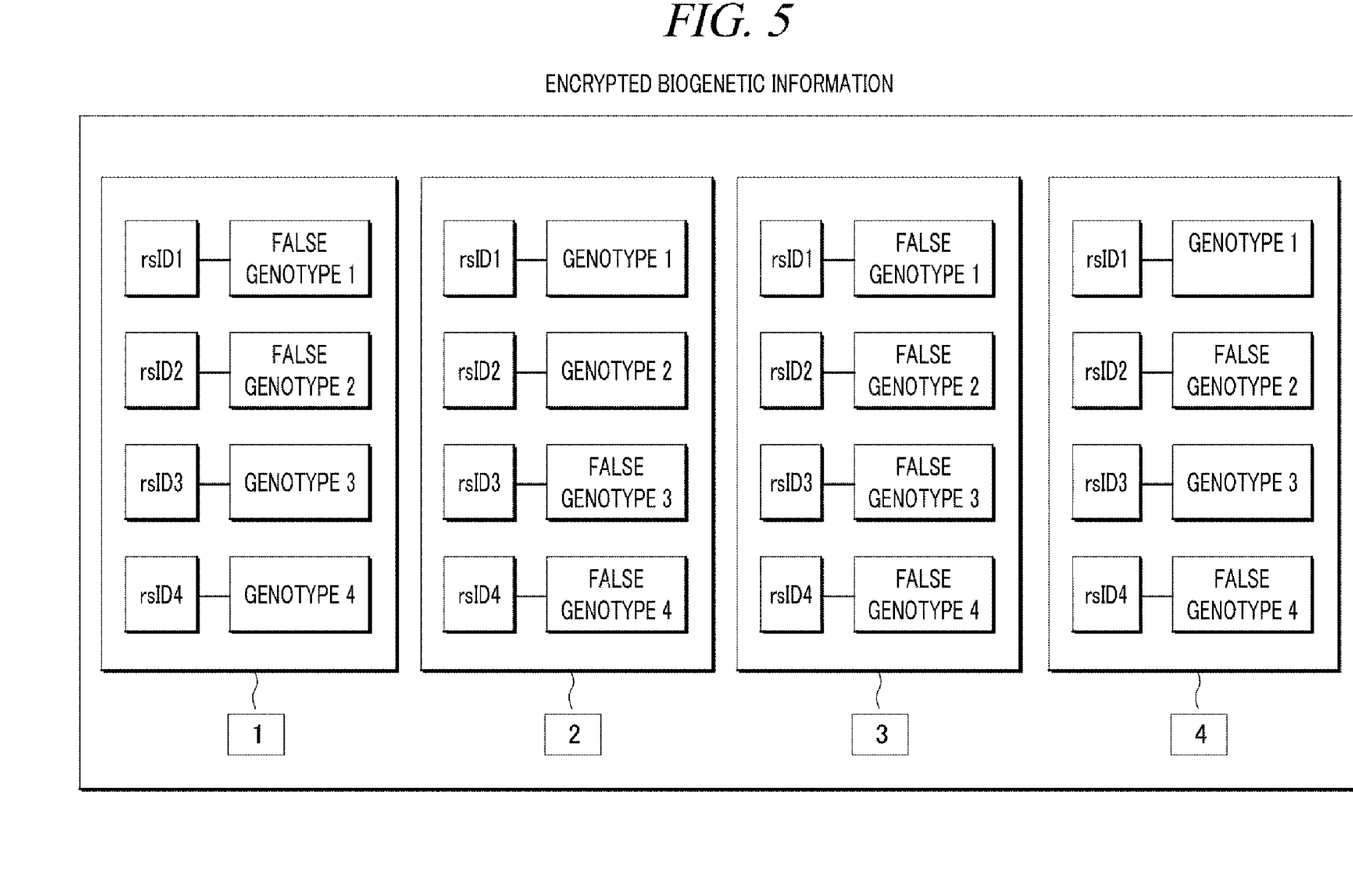
FIG. 5 shows a depiction of at least portions of encrypted biogenetic information, in accordance with at least portions of biogenetic information security, as described herein.

FIG. 5 shows a depiction of at least portions of encrypted biogenetic information, in accordance with at least portions of a biogenetic information protection, as described herein. FIG. 5 depicts the encrypted biogenetic information produced as a result of combining one or more portions of the false biogenetic information with none or at least one portion of the authentic biogenetic information. Encryption device 130 may divide the encrypted biogenetic information into multiple, e.g., four segments.

As depicted in FIG. 5, encryption device 130 may produce the first segment of the encrypted biogenetic information that includes a sequence of "false Genotype 1, false Genotype 2, Genotype 3, and Genotype 4," a second segment that includes a sequence of "Genotype 1, Genotype 2, false Genotype 3, and false Genotype 4," a third segment that includes a sequence of "false Genotype 1, false Genotype 2, false Genotype 3, and false Genotype 4," and a fourth segment that includes a random sequence of "Genotype 1, false Genotype 2, Genotype 3, and false Genotype 4." Further, encryption device 130 may assign, to the respective segments, the identifiers that may be, as a non-limiting example, any permutation of alphanumeric characters and/or words.

Thus, FIG. 5 shows a depiction of at least portions of encrypted biogenetic information, in accordance with at least portions of a biogenetic information protection, as described herein.

Figure 6:
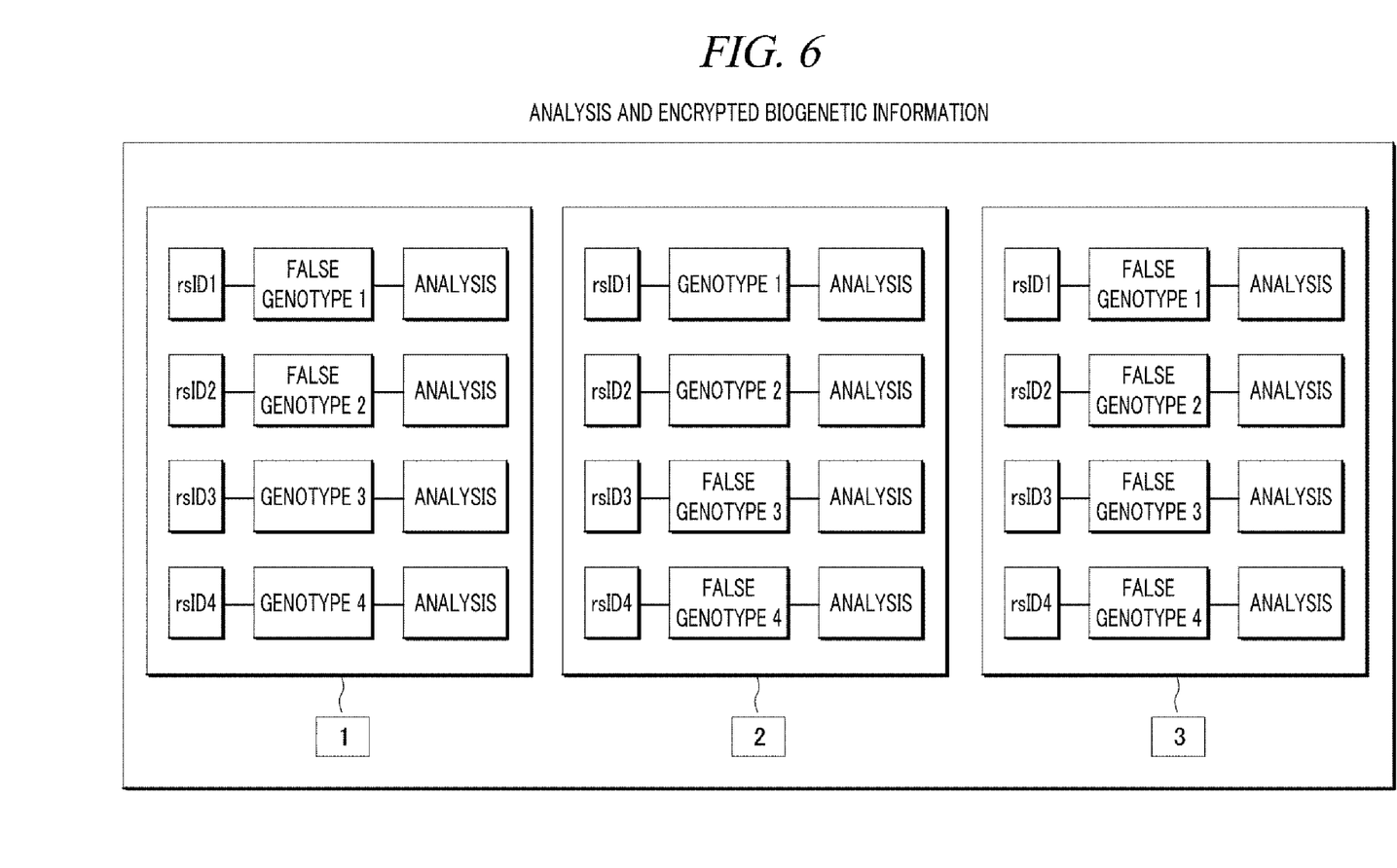
FIG. 6 shows a depiction of at least portions of analyzed and encrypted biogenetic information, in accordance with at least portions of biogenetic information security, as described herein.

FIG. 6 shows a depiction of at least portions of analysis and encrypted biogenetic information, in accordance with at least portions of a biogenetic information protection, as described herein. FIG. 6 depicts the encrypted biogenetic information and the analysis thereof. Gene analyzer 120 may genetically analyze a plurality of authentic biogenetic information and false biogenetic information included the respective segments of the encrypted biogenetic information by conducting operations to determine the order of the nucleotide bases, adenine, guanine, cytosine, and thymine, in a DNA oligonucleotide. As a result of genetic analysis, gene analyzer 120 may produce analysis such as genetic/inherited disorders and/or DNA sequences corresponding to the plurality of authentic biogenetic information and false biogenetic information. After gene analyzer 120 attaches the analysis to the respective Genotypes, gene analyzer 120 may transmit, to encryption device 130, the analysis of the encrypted biogenetic information, the encrypted biogenetic information, and the assigned identifiers.

Upon receipt of the encrypted biogenetic information, the analysis thereof, and the assigned identifiers, encryption device 130 may retrieve the first, the second, the third segments and their respective analyses, by comparing the assigned identifiers to the respective segments with the identifiers stored in encryption device 130, i.e., identifiers 1 to 3 because encryption device 130 may require only segments corresponding to the identifiers 1 to 3 to parse the authentic biogenetic information.

Thus, FIG. 6 shows a depiction of at least portions of analysis and encrypted biogenetic information, in accordance with at least portions of biogenetic information security, as described herein.

Figure 7:
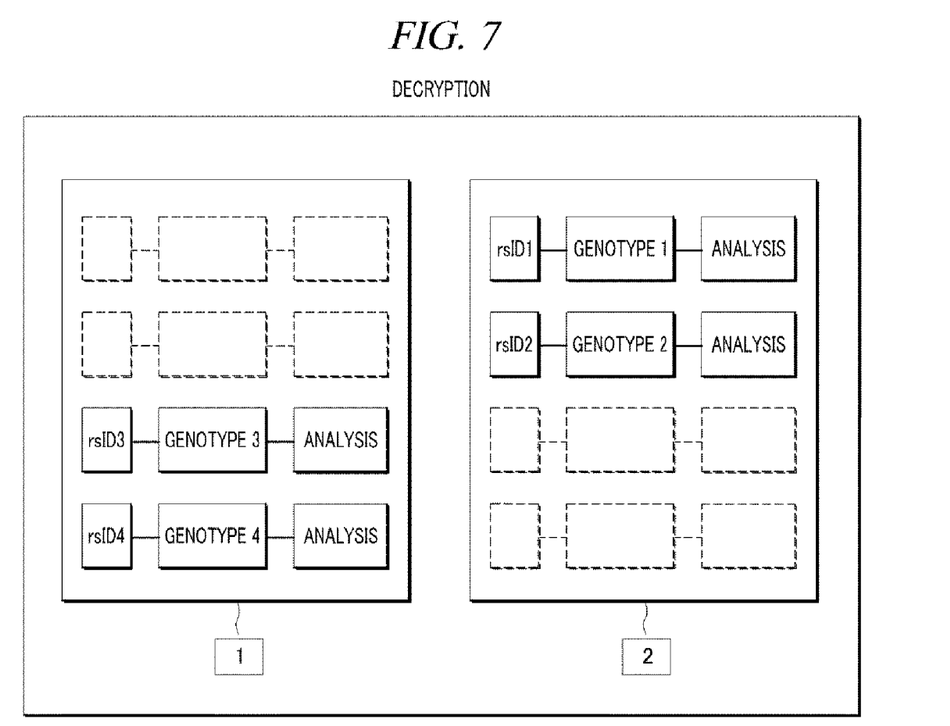
FIG. 7 shows a depiction of the decryption of at least portions of encrypted biogenetic information and analysis thereof, in accordance with at least portions of a biogenetic information protection, as described herein.

FIG. 7 shows a depiction of at least portions of decryption of encrypted biogenetic information and analysis thereof, in accordance with at least portions of biogenetic information security, as described herein. Encryption device 130 may decrypt the first, the second, and the third segments by deleting common false Genotypes and the analyses in the first segment and by deleting common false Genotypes and the analyses in the second segment.

To retrieve "Genotype 3", "Genotype 4", and the analyses, encryption device 130 may compare a sequence of "false Genotype 1, false Genotype 2, Genotype 3, and Genotype 4" in the first segment with a sequence of "false Genotype 1, false Genotype 2, false Genotype 3, and false Genotype 4" in the third segment. Because "false Genotype 1, false Genotype 2" in the first segment matches with "false Genotype 1, false Genotype 2" in the third segment, encryption device 130 may delete "false Genotype 1", "false Genotype 2" and the analyses in the first segment. Therefore, encryption device 130 may retrieve "Genotype 3", "Genotype 4", and the analyses in the first segment.

Similarly, to retrieve "Genotype 1", "Genotype 2", and the analyses, encryption device 130 may compare a sequence of "Genotype 1, Genotype 2, false Genotype 3, and false Genotype 4" in the second segment with a sequence of "false Genotype 1, false Genotype 2, false Genotype 3, and false Genotype 4" in the third segment. Because "false Genotype 3, false Genotype 4" in the second segment matches with "false Genotype 3, false Genotype 4" in the third segment, encryption device 130 may delete "false Genotype 3", "false Genotype 4" and the analyses in the second segment. As a result, encryption device 130 may retrieve "Genotype 3", "Genotype 4", and the analyses in the second segment.

Thus, FIG. 7 shows a depiction of at least portions of decryption of encrypted biogenetic information and analysis thereof, in accordance with at least portions of a biogenetic information protection, as described herein.

Figure 8:
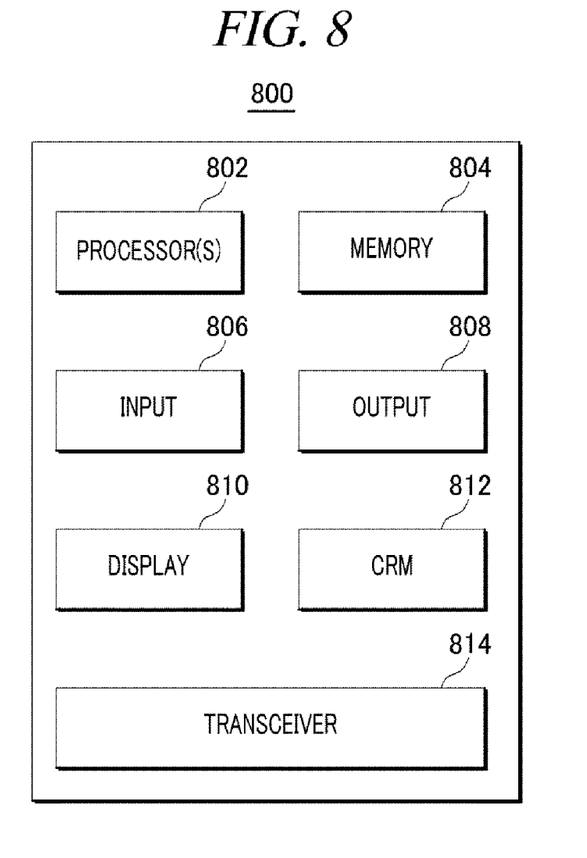
FIG. 8 shows an illustrative computing embodiment, in which any of the processes and sub-processes of biology information security may be implemented as computer-readable instructions stored on a computer-readable medium, in accordance with various embodiments described herein.

FIG. 8 shows an illustrative computing embodiment, in which any of the processes and sub-processes of a content sharing scheme may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 800 may typically include, at least, one or more processors 802, a system memory 804, one or more input components 806, one or more output components 808, a display component 810, a computer-readable medium 812, and a transceiver 814.

Processor 802 may refer to, e.g., a microprocessor, a microcontroller, a digital signal processor, or any combination thereof.

Memory 804 may refer to, e.g., a volatile memory, non-volatile memory, or any combination thereof. Memory 804 may store, therein, an operating system, an application, and/or program data. That is, memory 804 may store executable instructions to implement any of the functions or operations described above and, therefore, memory 804 may be regarded as a computer-readable medium.

Input component 806 may refer to a built-in or communicatively coupled keyboard, touch screen, or telecommunication device. Alternatively, input component 806 may include a microphone that is configured, in cooperation with a voice-recognition program that may be stored in memory 804, to receive voice commands from a user of computing device 800. Further, input component 806, if not built-in to computing device 800, may be communicatively coupled thereto via short-range communication protocols including, but not limitation, radio frequency or Bluetooth.

Output component 808 may refer to a component or module, built-in or removable from computing device 800, which is configured to output commands and data to an external device.

Display component 810 may refer to, e.g., a solid state display that may have touch input capabilities. That is, display component 810 may include capabilities that may be shared with or replace those of input component 806.

Computer-readable medium 812 may refer to a separable machine readable medium that is configured to store one or more programs that embody any of the functions or operations described above. That is, computer-readable medium 812, which may be received into or otherwise connected to a drive component of computing device 800, may store executable instructions to implement any of the functions or operations described above. These instructions may be complimentary or otherwise independent of those stored by memory 804.

Transceiver 814 may refer to a network communication link for computing device 800, configured as a wired network or direct-wired connection. Alternatively, transceiver 814 may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Thus, FIG. 8 shows an illustrative computing embodiment, in which any of the processes and sub-processes of a content sharing scheme may be implemented as computer-readable instructions stored on a computer-readable medium, in accordance with various embodiments described herein.

We claim:

1. A method performed under control of an encryption device, comprising:
   retrieving authentic genetic information from a genetic information database, wherein the authentic genetic information includes a single-nucleotide polymorphism (SNP) number and a corresponding genotype;
   generating false genetic information based on the authentic genetic information;
   encrypting the false genetic information to produce encrypted genetic information;
   assigning identifiers to multiple segments of the encrypted genetic information;
   transmitting the encrypted genetic information to be genetically analyzed to a gene analyzer;
   receiving, from the gene analyzer, an analysis of the encrypted genetic information;
   decrypting the analysis of the encrypted genetic information to parse the analysis of the authentic genetic information;
   comparing one of the multiple segments with the multiple segments of the encrypted genetic information; and
   restoring the analysis of the authentic genetic information.

2. The method of claim 1, wherein the encrypting includes adding one or more portions of the false genetic information to the respective segments of the encrypted genetic information.

3. The method of claim 1, wherein the respective segments of the encrypted genetic information are classifiable as hybrid data or wholly artificial data.

4. The method of claim 3, wherein various segments of the hybrid data include portions of the authentic genetic information.

5. The method of claim 4, wherein the portions of the authentic genetic information included in the segments of the hybrid data are retrieved by comparison with the wholly artificial data.

6. The method of claim 3, wherein the wholly artificial data includes the false genetic information.

7. The method of claim 4, wherein one of the segments of the hybrid data includes one or more portions of the false genetic information that are randomly arranged.

8. The method of claim 3, wherein the decrypting of the analysis of the encrypted genetic information includes retrieving the analysis of multiple segments of the encrypted genetic information, based on identifiers assigned to the multiple segments of the encrypted genetic information.

9. The method of claim 8, wherein the one of the multiple segments of the encrypted genetic information is classified as the wholly artificial data.

10. An encryption device, comprising:
a retriever configured to retrieve authentic genetic information from a genetic information database, wherein the authentic genetic information includes a single-nucleotide polymorphism (SNP) number and a corresponding genotype;
a generator configured to generate false genetic information based on the authentic genetic information;
an encryptor component configured to encrypt the false genetic information to produce encrypted genetic information;
an assignor component configured to assign identifiers to multiple segments of the encrypted genetic information;
a transmitter configured to transmit the encrypted genetic information to be genetically analyzed to a gene analyzer;
a receiver configured to receive, from the gene analyzer, an analysis of the encrypted genetic information;
a decryptor component configured to decrypt the analysis of the encrypted genetic information to parse the analysis of the authentic genetic information;
a comparator configured to compare one of the multiple segments with the multiple segments of the encrypted genetic information; and
a restoring component configured to restore the analysis of the authentic genetic information.

11. The encryption device of claim 10, wherein the encryptor component is configured to encrypt the false genetic information to produce the encrypted genetic information by adding one or more portions of the false genetic information to the respective segments of the encrypted genetic information.

12. The encryption device of claim 10,
wherein the respective segments of the encrypted genetic information are classifiable as hybrid data or wholly artificial data,
wherein various segments of the hybrid data include portions of the authentic genetic information, and
wherein the wholly artificial data includes the false genetic information.

13. The encryption device of claim 12, wherein the portions of the authentic genetic information included in the segments of the hybrid data are retrieved based on a comparison with the wholly artificial data.

14. The encryption device of claim 12, wherein at least one of the segments of the hybrid data includes one or more portions of the false genetic information that are randomly arranged.

15. The encryption device of claim 12, wherein the decryptor component is configured to parse the analysis of the authentic genetic information by retrieving the analysis of multiple segments of the encrypted genetic information, based on identifiers assigned to the multiple segments of the encrypted genetic information.

16. The encryption device of claim 15, wherein the one of the multiple segments of the encrypted genetic information is classified as the wholly artificial data.

17. A non-transitory computer-readable storage medium having thereon computer-executable instructions that, in response to execution, cause a device to perform operations, comprising:
retrieving authentic information from a genetic information database, wherein the authentic information includes a single-nucleotide polymorphism (SNP) number and a corresponding genotype;
generating false genetic information based on the authentic genetic information;
encrypting the false genetic information to produce encrypted genetic information;
assigning identifiers to multiple segments of the encrypted genetic information;
transmitting the encrypted genetic information to be genetically analyzed to a gene analyzer;
receiving, from the gene analyzer, an analysis of the encrypted genetic information;
decrypting the analysis of the encrypted genetic information to parse the analysis of the authentic genetic information;
comparing one of the multiple segments with the multiple segments of the encrypted genetic information; and
restoring the analysis of the authentic genetic information.

* * * * *